Dec. 2, 1958 H. W. FAEBER 2,862,705

THREADING MECHANISM

Filed Aug. 13, 1956 12 Sheets-Sheet 1

INVENTOR.
HARRY W. FAEBER

BY Campbell, Brumbaugh, Free & Graves
his ATTORNEYS

Dec. 2, 1958 H. W. FAEBER 2,862,705

THREADING MECHANISM

Filed Aug. 13, 1956 12 Sheets-Sheet 2

INVENTOR.
HARRY W. FAEBER

BY

Campbell, Brumbaugh, Free + Graves his ATTORNEYS

INVENTOR.
HARRY W. FAEBER
BY
Campbell, Brumbaugh, Free & Graves
his ATTORNEYS

INVENTOR.
HARRY W. FAEBER
BY
Campbell, Brumbaugh, Free + Graves
his ATTORNEYS

Dec. 2, 1958 H. W. FAEBER 2,862,705

THREADING MECHANISM

Filed Aug. 13, 1956 12 Sheets-Sheet 5

INVENTOR.
HARRY W. FAEBER

BY

Campbell, Brumbaugh, Free & Graves his ATTORNEYS

Dec. 2, 1958

H. W. FAEBER 2,862,705

THREADING MECHANISM

Filed Aug. 13, 1956

12 Sheets-Sheet 6

INVENTOR.
HARRY W. FAEBER
BY
Campbell, Brumbaugh, Free + Graves
his ATTORNEYS

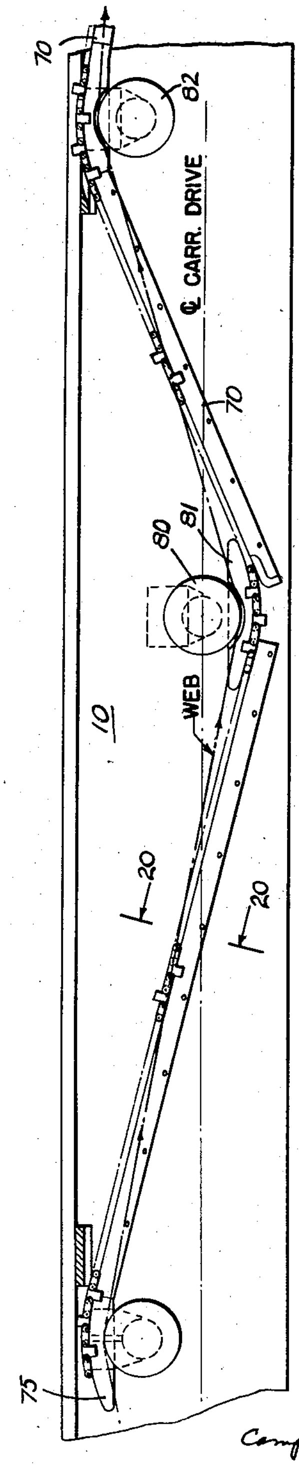
FIG.19.
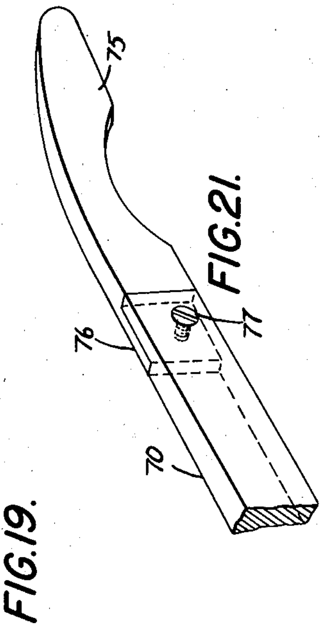
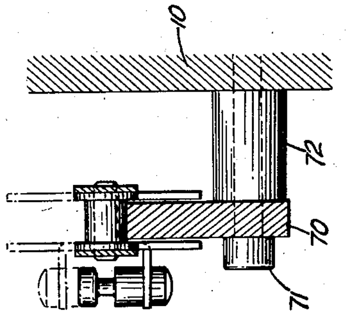
FIG.20.
INVENTOR.
HARRY W. FAEBER
BY
Campbell, Brumbaugh, Free & Graves
his ATTORNEYS DOUBLE 4 COLOR—SINGLE WEB—32 pp.

INVENTOR.
HARRY W. FAEBER
BY
Campbell, Brumbaugh, Free & Graves
his ATTORNEYS

DOUBLE 2 COLOR-WEB-32pp.

INVENTOR.
HARRY W. FAEBER

BY Campbell, Brumbaugh, Free & Graves
his ATTORNEYS

Dec. 2, 1958 H. W. FAEBER 2,862,705

THREADING MECHANISM

Filed Aug. 13, 1956 12 Sheets-Sheet 10

DOUBLE 2 COLOR—WEB—32pp.

INVENTOR.
HARRY W. FAEBER
BY
Campbell, Brumbaugh, Free & Graves
his ATTORNEYS

Dec. 2, 1958 H. W. FAEBER 2,862,705

THREADING MECHANISM

Filed Aug. 13, 1956 12 Sheets-Sheet 11

DOUBLE 2 COLOR—HALF WEB—16pp.

INVENTOR.
HARRY W. FAEBER

BY

Campbell, Brumbaugh, Free & Graves his ATTORNEYS

Dec. 2, 1958 H. W. FAEBER 2,862,705

THREADING MECHANISM

Filed Aug. 13, 1956 12 Sheets-Sheet 12

DOUBLE 2 COLOR—HALF WEB—16pp.

INVENTOR.
HARRY W. FAEBER

BY

Campbell, Brumbaugh, Free & Graves his ATTORNEYS

United States Patent Office 2,862,705

Patented Dec. 2, 1958

2,862,705

THREADING MECHANISM

Harry W. Faeber, Larchmont, N. Y., assignor to Time Incorporated, New York, N. Y., a corporation of New York Application August 13, 1956, Serial No. 603,701

8 Claims. (Cl. 271—2.1)

This invention relates to apparatus which is useful in the threading of the machines for processing an elongated sheet of material, in which the sheet follows a tortuous path over rolls or cylinders.

Machines for processing elongated sheets of material, in which the sheets generally are withdrawn from a supply roll, processed, and then rewound on a final roll (or folded and cut), require some provision for starting the sheet or web through the machine. For example, in paper or printing machines, the sheet or web must travel over a number of cylinders or rolls following a tortuous path, in order to be dried, coated, printed or otherwise processed according to the requirements of the particular operation. This has usually been done manually by grasping the leading edge of the web and threading it by hand through the machine over the various rolls in the desired path. This operation is time-consuming, laborious and expensive. Mechanical means and contrivances have been devised for performing this operation, but many disadvantages have been inherent in such prior art devices. The problem is particularly aggravated in the case of printing machines of the type which have plate and impression cylinders with bearers located at both ends of the cylinders. In such printing machines, automatic web threading devices have been considered impractical because the web has to be taken through the nip between the plate and impression cylinders. The plate cylinders are thrown off impression by no more than 0.050 inch or approximately $\frac{1}{16}$ of an inch, which allows very little room for any threading device to go through. Also, if the plate cylinder is inadvertently left "on impression" while attempting to thread the web, any rigid device that would have to pass between the plate and impression cylinders would unavoidably damage the bearers, not to mention the potential damage to the plates and the packing. Moreover, conventional web lead or web threading devices consisting only of one chain on one side of the press have a tendency to pull the web over toward that side, because only one edge of the web is attached to the device. This causes a considerable amount of difficulty in getting the web through the press, because it pulls the web beyond the actual body length of the rollers and thus deprives it of proper supports. Also, if such a device were used in an attempt to thread the web through the printing unit between the impression and the plate cylinders, and the cylinders were inadvertently left on impression, the paper web would pass between the bearers. Since the cylinders, when they are on impression, are held quite rigidly in position, and since the paper is substantially incompressible (except for a slight cushioning effect), it is readily appreciated that damage to the bearers or bearings could easily result.

An object of the invention is to devise a threading device for a machine for processing an elongated sheet of material, the machine having a series of rotatable cylinders adapted to engage the sheet and guide it through a tortuous path about the cylinders.

Another object of the invention is to provide a threading device that would not damage the printing machine if it should be used to thread the material while the plate and impression cylinders are on impression.

Still another object is to provide a threading device that is particularly useful for threading a web of paper through a printing machine.

Another object is to devise a means for driving the endless elements of a threading mechanism that will permit a slow, controlled movement of the endless elements while the mechanism is not in use, to prevent overheating thereof in the hot dryer sections of the printing machines.

These and other objects and advantages of the invention are realized in a machine having a pair of elongated elements such as endless chains, on opposite sides of the machine that are movable along the path of the material that is being processed. An elastic band or strip is secured to each of these elongated elements, traversing the machine so as to form an elastic connection between the endless elements. Such band or strip is preferably made of silicone elastomer so as to withstand the elevated temperature prevailing, for example, in the dryers of the printing machine. Means are provided on the elongated elements for securing this elastic band. The leading edge of the sheet of material is fastened to the elastic strip so that as the elastic strip is carried through the machine by the elongated elements along the path of the material, the material itself also is led through the machine in the desired path. Preferably, means are also provided to guide the elongated elements in the predetermined path so as to resist the inward pull exerted by the elastic strip.

The improved driving mechanism for the elongated elements, and through the elements the leading edge of the material itself, comprises a rotatable shaft and members such as sprockets, driven by the shaft, that engage the elements. Associated with the shaft there is provided a first driving head that has three general requirements: (1) it is rotatable independently of the shaft, (2) it is connected with means for driving the elongated elements at idling speed, and (3) it is provided with means for engaging a clutch. The driving mechanism also has a second driving head that is (1) rotatable independently of the shaft, (2) operatively connected with means for driving the elements at approximately the speed of the sheet of material, and (3) has a means for engaging the same clutch. The clutch is so mounted and arranged that it is constrained to rotate with the shaft and is operable, as by sliding axially along the shaft, to engage each of the clutch-engaging means of the driving heads. The clutch, therefore, may be placed in engagement with the first driving head to drive the elements at idling speed, or may be placed in engagement with the second driving head to drive the elements approximately at the speed of the sheet of material for the purpose of threading the machine, or the clutch may be placed in a neutral position out of engagement with both of the driving heads, in which case the elongated elements will be stationary.

The structure of the invention may be understood from the following description, considered together with the drawings, in which:

Figure 19 is a side elevation view showing the details of the chain guide structure;

Figure 20 is a sectional view taken on a plane indicated by the line 20—20 in Figure 19 and looking in the direction of the arrows;

Figure 21 is an isometric view showing the guide shoe in detail, and in detail how it is secured to the guide rail;

*Arrangement of the threading chains*

Figure 1:
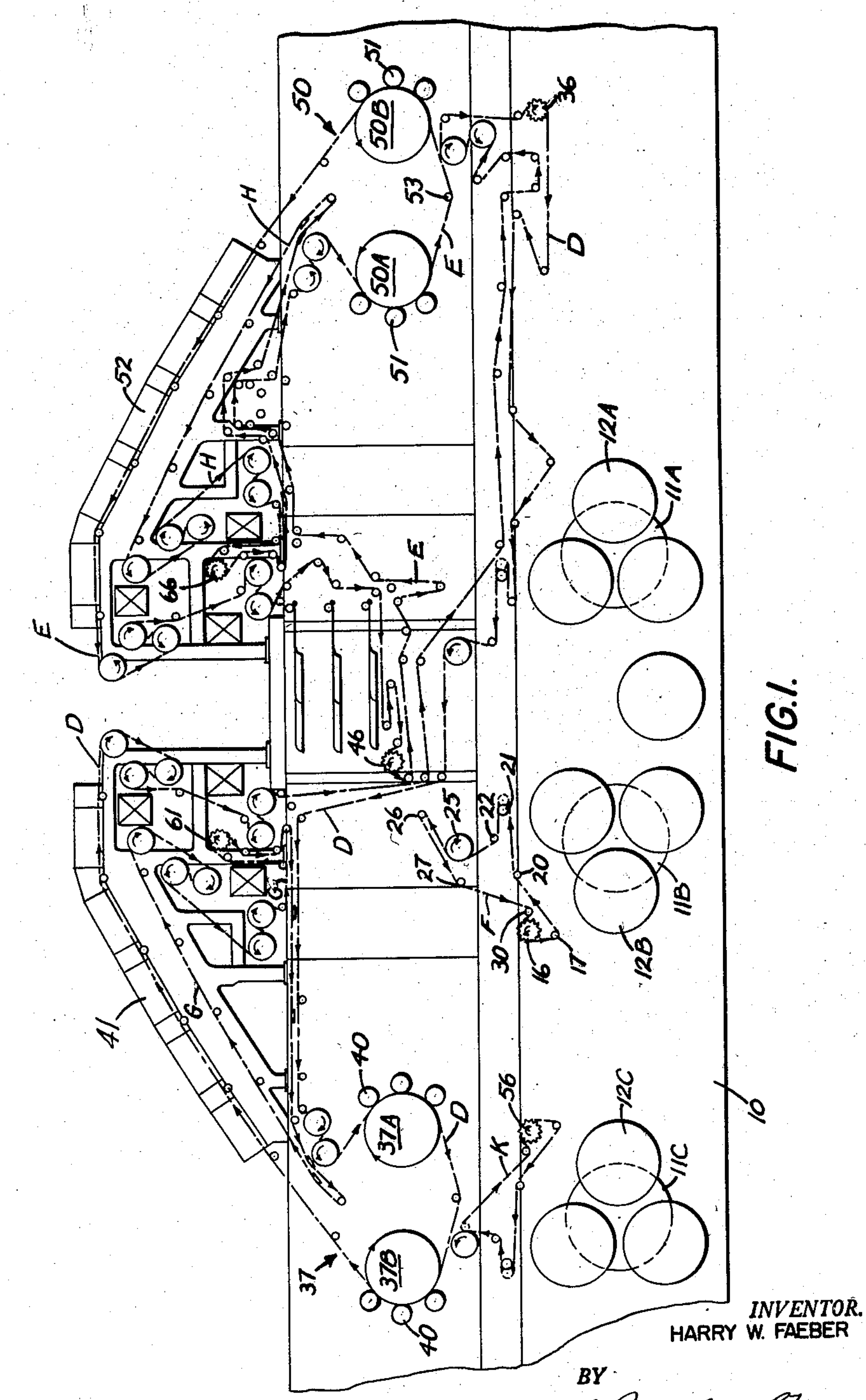
Figure 1 is a side elevation view, partly schematic, of a printing machine, showing how the elongated threading elements are arranged on the machine.

Referring to Figure 1, the machine frame 10 supports a series of three-roll rotatable reels 11A, 11B and 11C, shown schematically, each of which is adapted rotatably to support three rolls of paper or similar sheet material 12A, 12B and 12C, respectively.

The printing machine is supplied with six separate sets or pairs of endless chains for the threading of the paper, with manual transfer of the sheet from one pair of chains to the next at the points designated hereinafter. The chain pair F, which is used to carry the paper supplied from the rack 11B, is driven by the sprockets 16 at the desired web threading speed during the threading operation. The sprockets are also associated with means described more fully hereinafter for disconnecting the drive from the sprockets so that the chains will be stationary when they are not in use. The chains pass around the sprockets 17, 20, the take-up sprockets 21 (which, by means of an adjusting mechanism not shown, is used to adjust the tension in the chains), the small sprocket 22, the large sprocket 25, and the small sprockets 26, 27 and 30. Instead of sprockets, shoes may be provided which serve to guide the chain in a curved path, as described more fully hereinafter. However, where the chain makes a sharp change in direction, particularly where it makes a 180 degree bend as it does at the sprockets 21 and 26, it is preferred to use sprockets rather than shoes for guiding the chains. Between each of the sprockets or shoes in the web-advancing sections of the chain, guide rails are preferably provided to prevent the elastic band from drawing the chain out of its path inwardly toward the center of the machine. However, they need not be provided in the return sections of the chains, wherein the web is not attached to the elastic band. The rails and the way in which they support the chain will be described more fully hereinafter.

The pair of threading chains D is driven by the sprockets 36 which are connected to a driving mechanism of the type more fully described hereinafter, which permits the movement of the chains at a slow speed when they are not in use in order to keep them from becoming overheated in the dryer, and at substantially the web speed when they are in use. The chains advance from the sprockets 36 forward over a series of small sprockets or shoes, of the type described in connection with the threading chains F. Thereafter they pass to the first impression or printing unit 37, which is composed of a first impression roll 37A and a second impression roll 37B. Each impression cylinder is provided with a series of plate cylinders 40 (in accordance with conventional printing press design). To guide the pair of chains around these impression rollers 37A and 37B, it is preferred to use guide shoes, hereinafter more fully described, rather than sprockets since the packing lock-up mechanisms which generally are used on the impression cylinders and the plate cylinder throw-off mechanisms mounted inside the frames may interfere with rotatable sprockets.

After the threading chains D leave the first impression unit 37, they pass upwardly over another series of small guiding sprockets or shoes into the dryer 41, then over a series of large guide rolls or shoes in a tortuous path. The chains then leave the dryer section and finally are returned to the power-driven sprocket 36. Just as in the case of the threading chains F, the pair of threading chains D is preferably provided with guide rails, hereinafter more fully described, in the web-advancing sections where it is pulling and threading the web, to prevent inward deflection of the chains toward the center of the machine. However, such guide rails need not be provided in the return sections of the chain.

The pair of threading chains E is driven by the sprockets 46 which, in turn, are driven by the same type of dual drive means indicated in connection with the pair of threading chains D, more fully described hereinafter. The chains E, after they leave the power sprockets 46, pass over a series of small guiding sprockets or shoes and then approach the second printing unit 50, which is composed of a first printing or impression cylinder 50A and a second cylinder 50B. Each cylinder is provided with a series of plate cylinders in accordance with conventional printing press design. Another series of guide sprockets or shoes carries the pair of chains upwardly into the second drying chamber 52. Thereafter, the chains E are returned to the driving sprockets 46, following a tortuous path over the large and small guide sprockets or shoes indicated schematically in Figure 1. Guide rails, described more fully hereafter, are used in the sections of the chain where the threading is carried out, but need not be supplied in the return sections of the chain.

The chain pair K is similar to the pair of threading chains F in that they carry the paper sheet from the roll 12C on the three-roll rotatable reel 11C and carry it to the first impression unit 37. The driving sprockets 56 and the driving mechanism connected therewith are also similar to the driving mechanism which actuates the sprockets 16 of the chains F.

Another pair of threading chains is designated "G." It is conveyed over a series of large and small sprockets or shoes indicated schematically and is driven by the sprockets 61. The sprockets 61 are similar to the driving sprockets of the chain pair D and are driven by means similar to the driving means 36, so that the chains G may be idled when not in use to prevent overheating in the dryer 41 or may be operated at web threading speed when desired, or may remain stationary.

The pair of threading chains H is driven by the sprockets 66, which is similar to the sprockets 61 of the chains G and is also otherwise similar to chains G.

*Chain structure and guiding means*

Referring to Figures 19, 20 and 21, the guide rails 70 are secured to the base or frame of the machine 10 by the bolts 71 and spaced from the frame by the spacers 72. At the point where the chain meets the guide rail, there may be provided a shoe 75, shown in detail in Figure 21, which is attached to the end of the rail 70 by a lapped joint 76 and a bolt 77. Where the chain passes over a web guiding roll 80, there may be provided a double-ended shoe 81 secured to the machine frame 10 as shown in Figure 19. At the roll 82 the rail 70 is joined to still another type of shoe 75 for leading the chain in a curved path around the roll.

Figure 2:
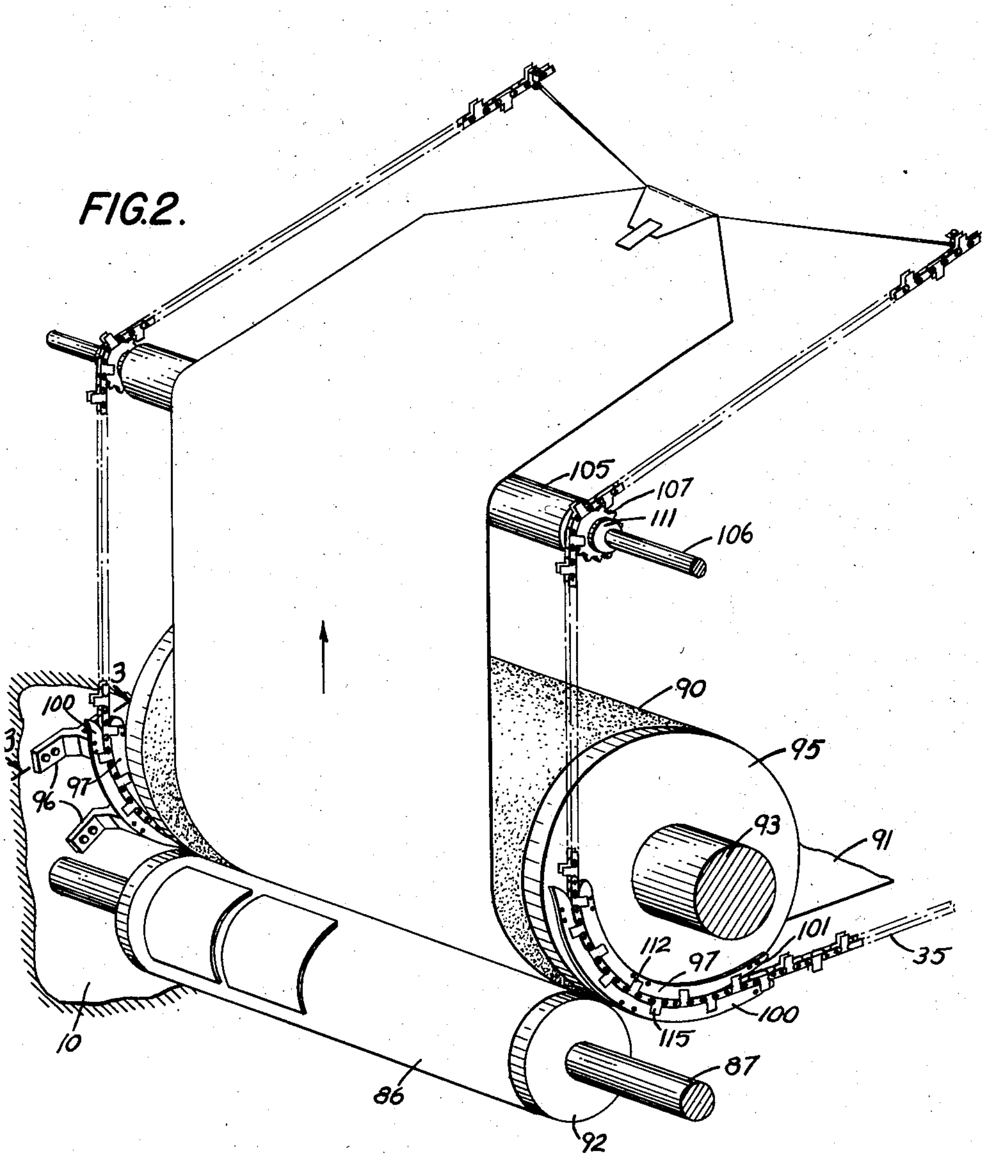
Figure 2 is an isometric view of a portion of the threading mechanism, showing how it leads the sheet of material through the nip between the plate and impression cylinders of the printing machine.
Figure 3:
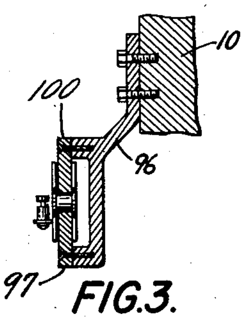
Figure 3 is a detailed sectional view of a guide mounting, taken on a plane indicated by the line 3—3 in Figure 2 and looking in the direction of the arrows.
Figure 4:
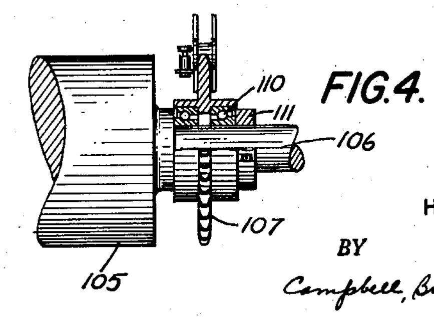
Figure 4 is a detailed view, partly in section, of a guide sprocket for the endless chain, showing how it is mounted on one of the shafts which support a guide roll.

In Figures 2, 3 and 4 there is shown another type of guide shoe and also the details of the structure of the guide sprocket heretofore mentioned. One or more plate cylinders are provided with shaft extensions 87, which are supported and turn in bearings not shown in the machine frame. A large back-up or impression cylinder 90 is provided to support the running web while the plate cylinders exert a sufficient and desired amount of pressure on the sheet of paper 91. The back-up or impression cylinder 90 is supported by the shaft extensions 93, which turn in bearings and are supported thereby, mounted in the machine frame. At the ends of the two cylinders 86 and 90, bearing surfaces or "bearers" for the plate cylinder 92 and for the impression cylinder 95 are provided. These come into direct contact with each other and thereby control the spacing of the cylinders 86 and 90, according to conventional procedure.

Inasmuch as throw-off mechanisms are generally provided to permit the shifting of the impression and plate cylinders into operative and inoperative positions, which throw-off mechanisms are mounted on the inside of the frames (not shown), and plate and packing lock-up mechanisms are mounted at the ends of the plate and impression cylinders, respectively, it is not generally possible to use guide sprockets as shown in Fig. 4. Therefore, it generally will be preferred to supply the impression and plate cylinder assembly with guiding shoes of the type illustrated in Figure 2. In Figure 2, the mounting brackets 96 are secured to the machine frame 10. The inner shoes 97 and the outer shoes 100 are mounted to the brackets 96, as shown in Figure 3. The chain 35 enters the space between the inner and outer shoes through the bell mouth opening 101 and is guided in its curved path around the pack-up cylinder 90, as desired.

Referring to Figure 4, the web guide roll 105 is mounted on a shaft 106 which turns in a bearing in the machine frame, not shown. The sprockets 107 are mounted on the shaft 106 by the bearing 110, held in place by the collar 111 which is secured to the shaft. The sprockets 107 therefore are free to turn on the shaft 106 independently of the roll 105 and the shaft itself.

Figures 6 to 12, inclusive, show the preferred form of threading chain and several types of attachments for securing the elastic band thereto. The chain 35 can be of the conventional link type, comprising plates, spacers and pins. However, some of the plates, preferably alternate plates, have either an upstanding flange or lug 112 or a depending flange or lug 115. The upstanding lugs 112 fit over the edge of one shoe and the depending flanges 115 fit over the mating shoe if there is one, thereby to guide the chain in the desired path as shown in Figure 2. The lugs 112 and 115 also fit over the guide rails 70 and shoes 81 and 85 as shown in Figure 19, to prevent the chain from being drawn inwardly toward the center of the machine by the force exerted thereon by the elastic band.

Figure 6:
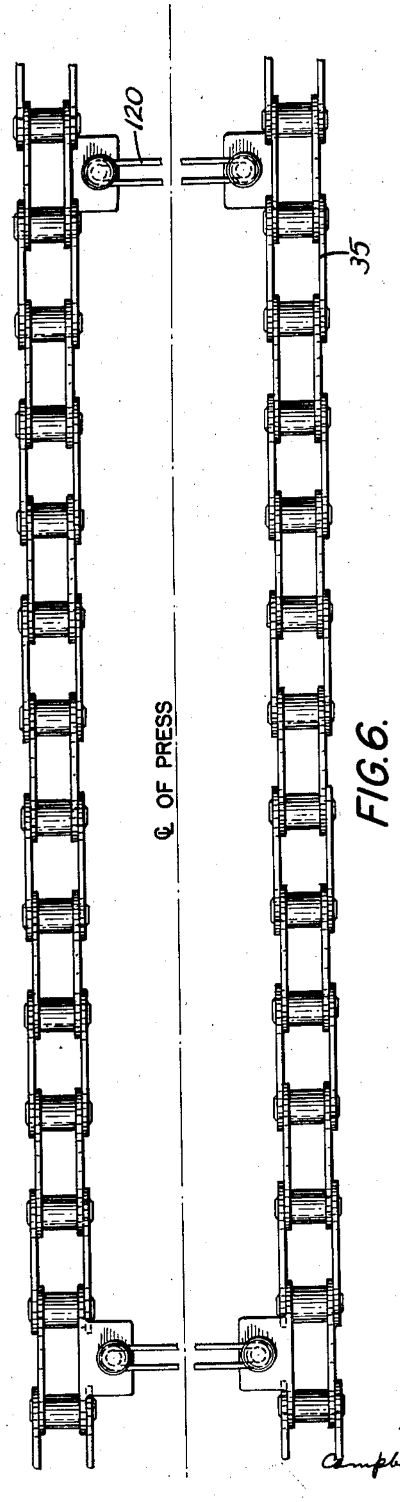
Figure 6 shows the pair of endless chains with the elastic band connected between the fastening elements thereof.
Figure 8:
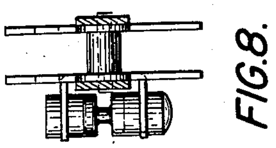
Figure 8 is a vertical sectional view taken on a plane indicated by the line 8—8 in Figure 7 and looking in the direction of the arrows.
Figure 9:
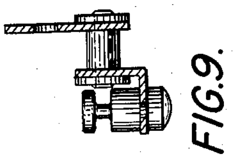
Figure 9 is a view similar to Figure 8, taken on a plane indicated by the line 9—9 of Figure 7 and looking in the direction of the arrows.
Figure 10:
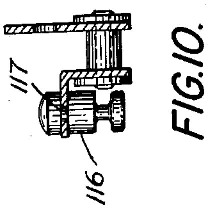
Figure 10 is a view similar to Figures 8 and 9, taken on a plane indicated by the line 10—10 of Figure 7 and looking in the direction of the arrows.
Figure 11:
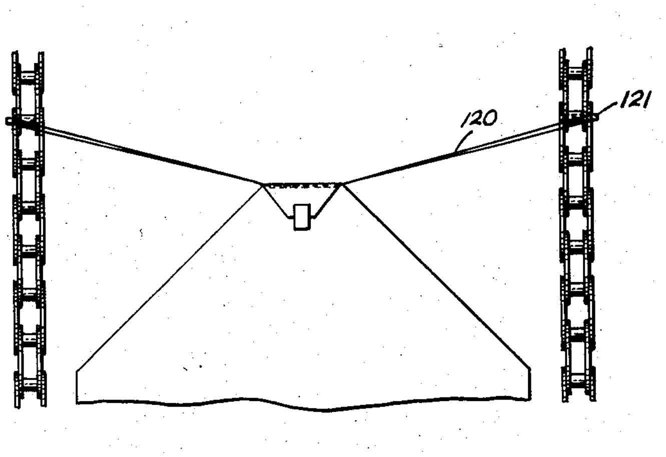
Figure 11 illustrates an alternative manner of securing the elastic band to the endless chains.
Figure 12:
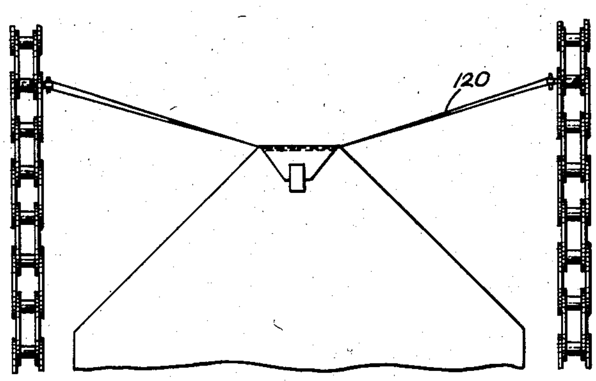
Figure 12 illustrates the use of still another means for securing the elastic band to the endless chains.

To provide means for securing the elastic band to the chain, one of the flanges 112 or 115 is bent inwardly and a cleat 116 is mounted thereon through the hole 117, as by riveting or welding. If desired, an upwardly extending flange may be bent over and a cleat mounted thereon extending downwardly, as shown in Figure 10, or a depending flange 115 may be bent inwardly and a cleat mounted thereon extending upwardly, as shown in Figure 9. Preferably, the downwardly extending and the upwardly extending cleats alternate with each other along the length of any given chain. Moreover, the chains are preferably assembled in the threading mechanism with the cleats of the two chains opposite each other, as shown in Figures 6, 11 and 12, so that the elastic band 120 secured to opposite cleats 116 may extend directly across the machine. Also, cleats may be mounted along the chain with sufficient frequency, say every 12", in which case it is not absolutely necessary to keep the cleats in line.

Figure 14:
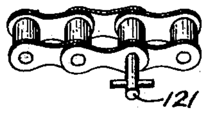
Figure 14 is an isometric view of another securing means.
Figure 15:
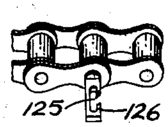
Figure 15 is an isometric view of still another securing means.
Figure 13:
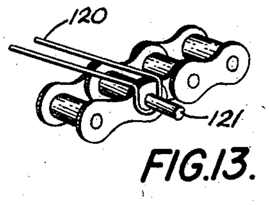
Figure 13 is a detailed isometric view of the means shown in Figure 11 for securing the elastic band to the endless chain.
Figure 16:
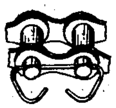
Figure 16 is an isometric view of another securing means.
Figure 17:
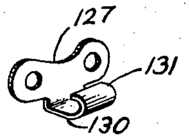
Figure 17 is an isometric view of another securing means.

In Figures 13 to 17, inclusively, other types of attachments for securing the elastic band 120 to the chains are disclosed. In Figure 13 the pins of the chain are projected outwardly to form an extension 121, over which the elastic band is looped. In Figure 14, the extension 121 is provided with a cross piece in the form of a T. In Figure 15 the extension is provided with a recess 125, forming a hook 126 adapted to hold the elastic band. In Figure 16 a piece of stiff wire is extended through holes in adjacent pins and looped around to form hooks, designed also to hold the elastic band. In Figure 17, the plate 127 is provided with an extension 130 which is curved upwardly to form the hook 131, which is also designed to catch and hold the elastic band. The extended pin 121 must extend outwardly away from the center of the machine as shown in Figure 11 in order to secure the elastic band. However, the attachments illustrated in Figures 14 to 17, inclusive, may extend inwardly or outwardly away from the center of the machine and still hold the elastic band, in the manner illustrated in Figure 12.

Figure 18:
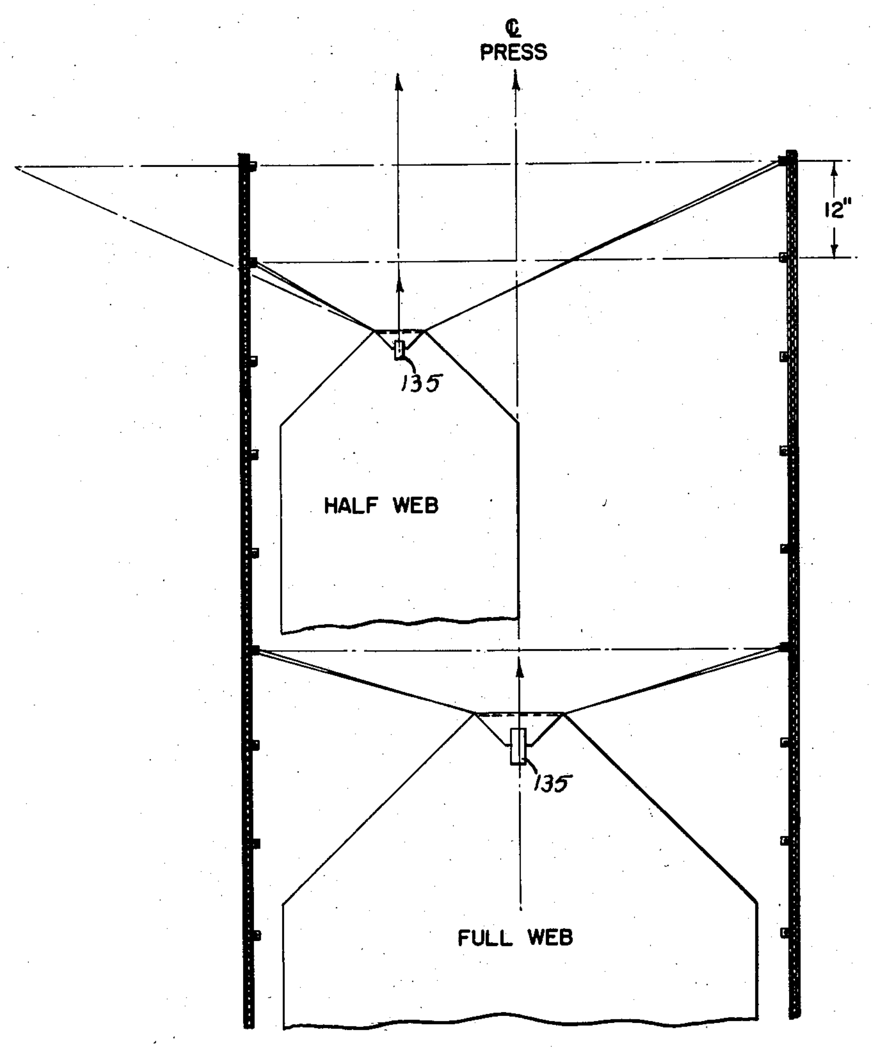
Figure 18 illustrates how the full web and the half web are fastened, through the elastic band, to the endless chains.

Referring to Figure 18, if a full web is being printed, it generally will be preferred to secure the elastic band at points directly opposite each other on the two chains, as shown in the bottom portion of Figure 18. However, if only a half web is being processed, the chain that is farthest from the web may have the elastic band attached to it at a point about 12 inches ahead of the corresponding point where the elastic band is secured to the other chain. It has been found that this arrangement tends to keep the half web moving in a straight line at one side of the machine as desired, without pulling it over toward the center of the machine as it is carried through the printing press.

After looping or otherwise securing the elastic band to the two chains, the forward end of the web can be folded over the band, either at the center point in the case of the full web or to one side in the case of the half web, as shown in Figure 18, and the tab which is formed can be fastened to the main body of the web by a piece of tape 135.

*The driving mechanism*

Figure 5:
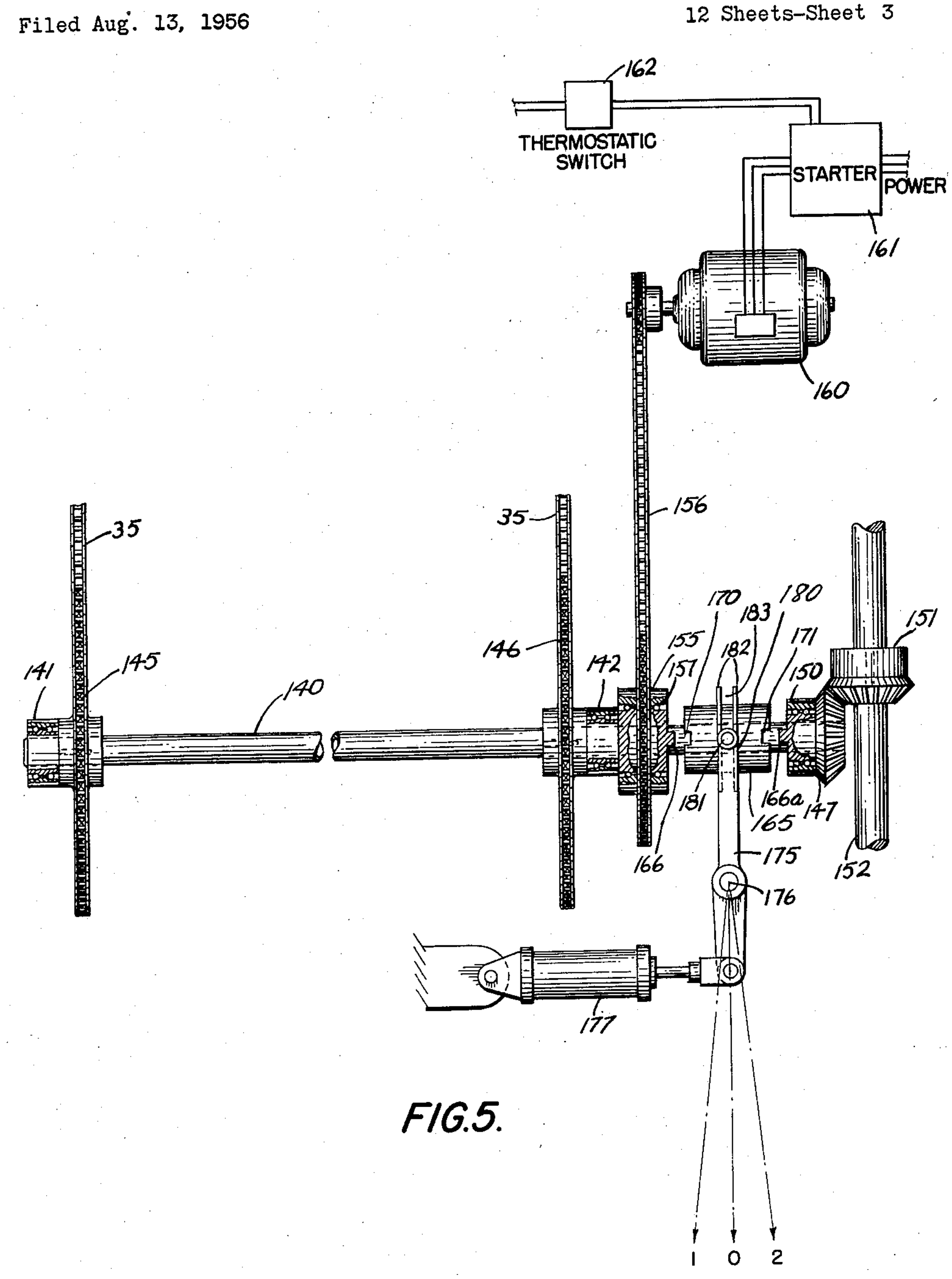
Figure 5 is a general view of the mechanism for driving the endless chains.
Figure 7:
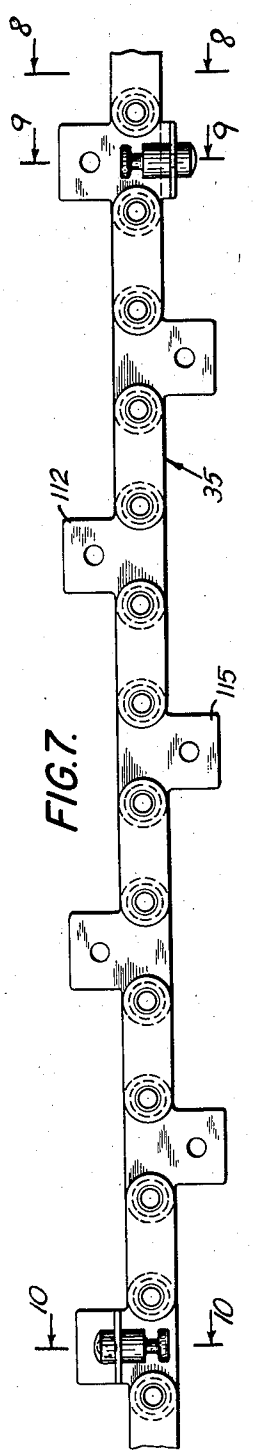
Figure 7 is an elevation view of one of the endless chains, as seen from inside the machine.

The driving mechanism shown generally and in detail in Figure 5 comprises a shaft 140, which is mounted in the bearings 141 and 142 secured to the machine frame which is not shown. The sprockets 145 and 146 have teeth engaging the roller chains 35 and are keyed to the shaft 140. The shaft is provided at one end with a bevel gear 147, which is free to turn with respect to the shaft on the bearing 150. A second bevel gear 151 meshes with the gear 150 and is keyed to the driven shaft 152, which is connected with the main press drive for driving the chains at the same speed as the speed of the paper web in the press. A sprocket 155 having a cooperating chain drive 156 is supported by the shaft 140 but is free to turn with respect to the shaft on the bearing 157. The chain 156 is driven by the motor 160, which is actuated by the starter 161 and the thermostatic switch 162, the latter being actuated by a thermocouple located in the dryer which indicates the temperature of the chain therein. The switch 162 is operative to start the motor 160 when the temperature of the portion of the chain inside the dryer reaches a predetermined level.

A clutch 165 is free to slide in an axial direction on the shaft 140 but is constrained by means such as sliding keys or splines, which are not shown in the drawings, to rotate with the shaft. The adjacent faces of the sprocket 155 and the bevel gear 147 are provided with the clutch-engaging lugs or projections 166 and **166*a*, respectively, which cooperate with the mating recesses or grooves 170 and 171 of the clutch 165. The clutch also has a pair of parallel peripheral flanges 182 forming a groove 183** therebetween which is instrumental in adjusting the position of the clutch, as will now be described.

The clutch arm 175 pivots on the stationary pivot 176 and is actuated by the solenoid or air cylinder 177. The clutch end of the arm 175 is in the form of a yoke 180, which extends around the adjacent portion of the clutch 165. The pins 181 secured to the yoke arms extend into the groove 183, and by means of conventional follower rollers or sliding blocks engage the flanges 182 of the clutch, to move the clutch from one side to the other or place it in the center out of engagement with the two clutch-engaging surfaces of the sprocket 155 and the bevel gear 147.

The operation of the chain-driving mechanisms is as follows. During the threading of the web, the clutch arm 175 is moved by means of manual pushbutton controls acting on a solenoid air valve (not shown) into position 1 so that the clutch will engage the bevel gear 147 and the shaft 140 will be driven at threading speed by the driving shaft 152. When the threading is complete, the clutch arm 175 is moved by means of the above-described manual pushbutton means into the position 2. Here the chain will be stationary. If, however, the thermostatic switch 162 is actuated, for example by the thermocouple located in the drying oven, indicating that the temperature of the chain in the drying oven is becoming undesirably high, the motor 160 will be started, driving the sprocket 155 so that the chains 35 will be moved at an idling speed through the dryer to prevent overheating and possible damage to the chains. Automatic electric controls (not shown) prevent the shifting of the clutch into position 1 while the press is running at a speed higher than 40 F. P. M., approximately.

*The threading operation*

Figure 22:
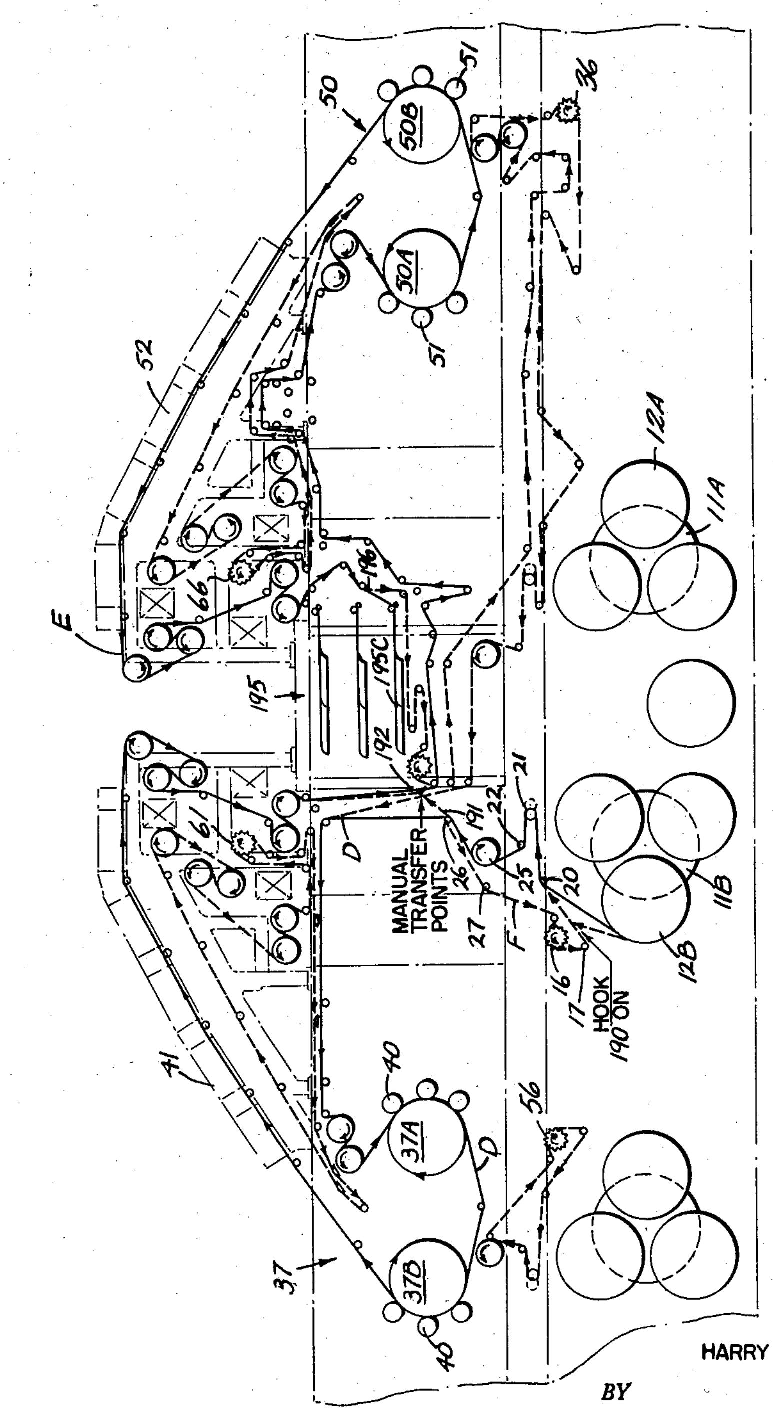
Figure 22 is a view similar to Figure 1, illustrating how the mechanism may be used to thread the machine for double four-color single web 32-page printing or for double four-color half web 16-page printing.

I will now refer to Figure 22 for the purpose of describing how the continuous web-threading chains and the cooperating mechanism is used to thread a printing press to print a double four-color 32-page single web, or a double four-color 16-page half web. The paper from the roll 12B mounted on the rack 11B is hooked on to an elastic band secured to the chains F in the manner heretofore described at the station 190. The web is then threaded over the roll 20, the take-up roll 21, and the guide rolls 22, 25 and 26. At 191 the web is removed from the chains F and is transferred manually to the pair of threading chains D. The first pair of threading chains then returns free of the web of paper, to the point 190 by way of the path shown in Figures 1 and 22.

The leading edge of the paper web, which has now been secured to the second pair of threading chains D, is carried through its path, as shown in Figures 1 and 22, over the small guide rolls which lead to the first impression unit 37. It passes over the respective printing or impression cylinders 37A and 37B, and under the plate cylinders 40; then through the first dryer 41. When the web passes through the dryer and has reached the point 192, it is transferred manually from the chains D to the third pair of threading chains E. The latter carry the web through the second printing unit, comprising the impression cylinders 50A and 50B, respectively, after which the web enters the second dryer 52. From the dryer 52 the web passes downwardly in a tortuous path over the guide rolls shown and into the folder 195C, where it is detached from the threading chains at 196. The threading chains, free of the web, return to the hook-on point 192.

Figure 23:
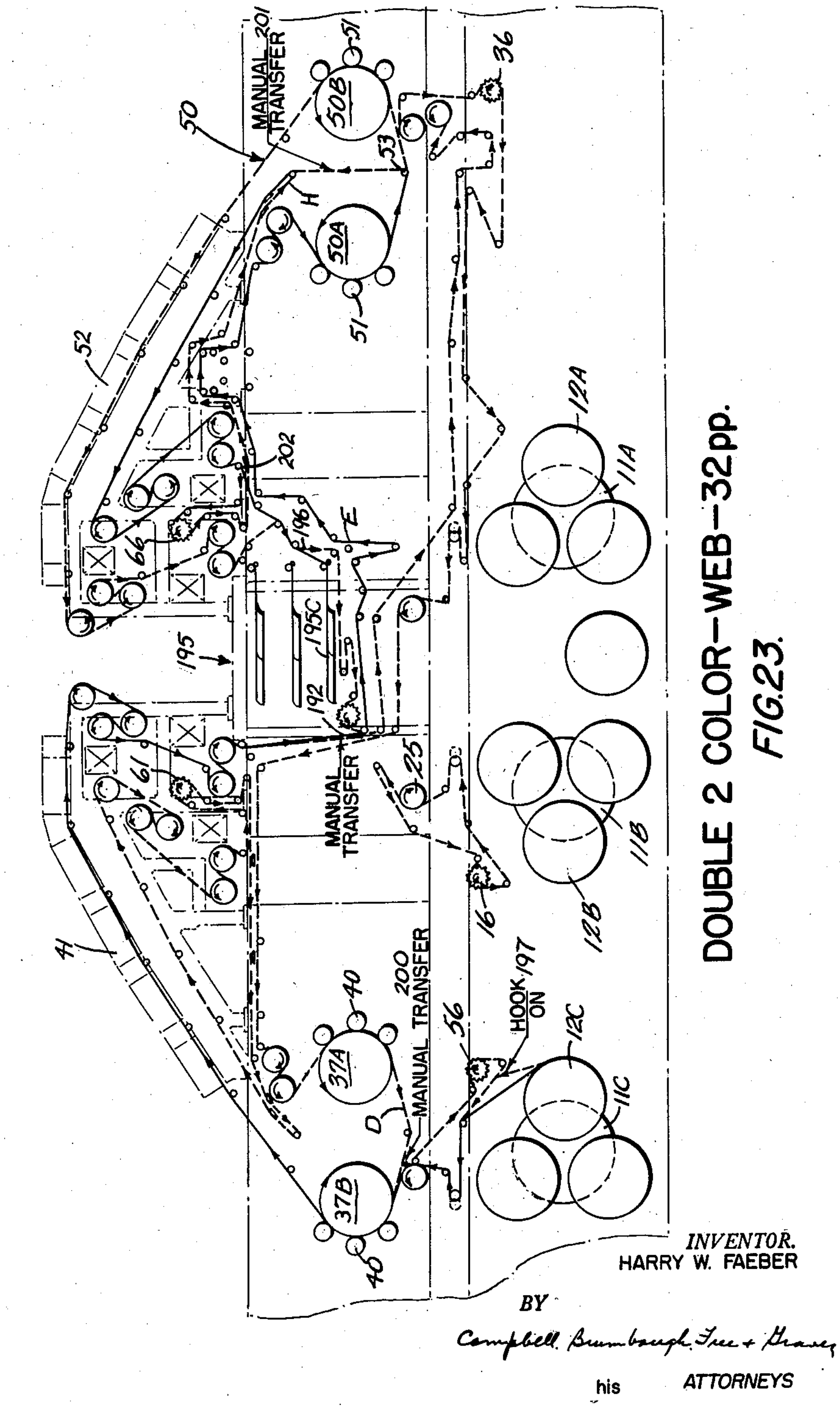
Figure 23 is a view similar to Figure 22, showing how the machine may be threaded for double two-color web 32-page printing.

In Figure 23, there is shown schematically the manner of threading the printing press for the purpose of printing a double two-color 32-page web. In this case the paper is withdrawn from the roll 12C mounted on the supporting frame 11C and is hooked on to the chains K at the hook-on station 197. The web is carried around the guide and take-up rollers shown to the transfer point 200, where it is transferred to the chains D, passing between the impression cylinder 37B and the plate cylinders 40 of the first impression unit 37. The web passes through the dryer 41 and is manually transferred from the chains D to the chains E at 192. The chains E carry the web to the second impression unit 50, as described above in connection with Figure 22. However, after the web has passed around the first impression cylinder 50A and the small guide roll 53, it is manually transferred at 201 to the pair of threading chains H. The latter carries the web through the second dryer 52. At 202, the web is transferred manually from the threading chains H back to the threading chains E. At 196 the web is again removed from the latter threading chains and fed to the folder 195C.

Figure 24:
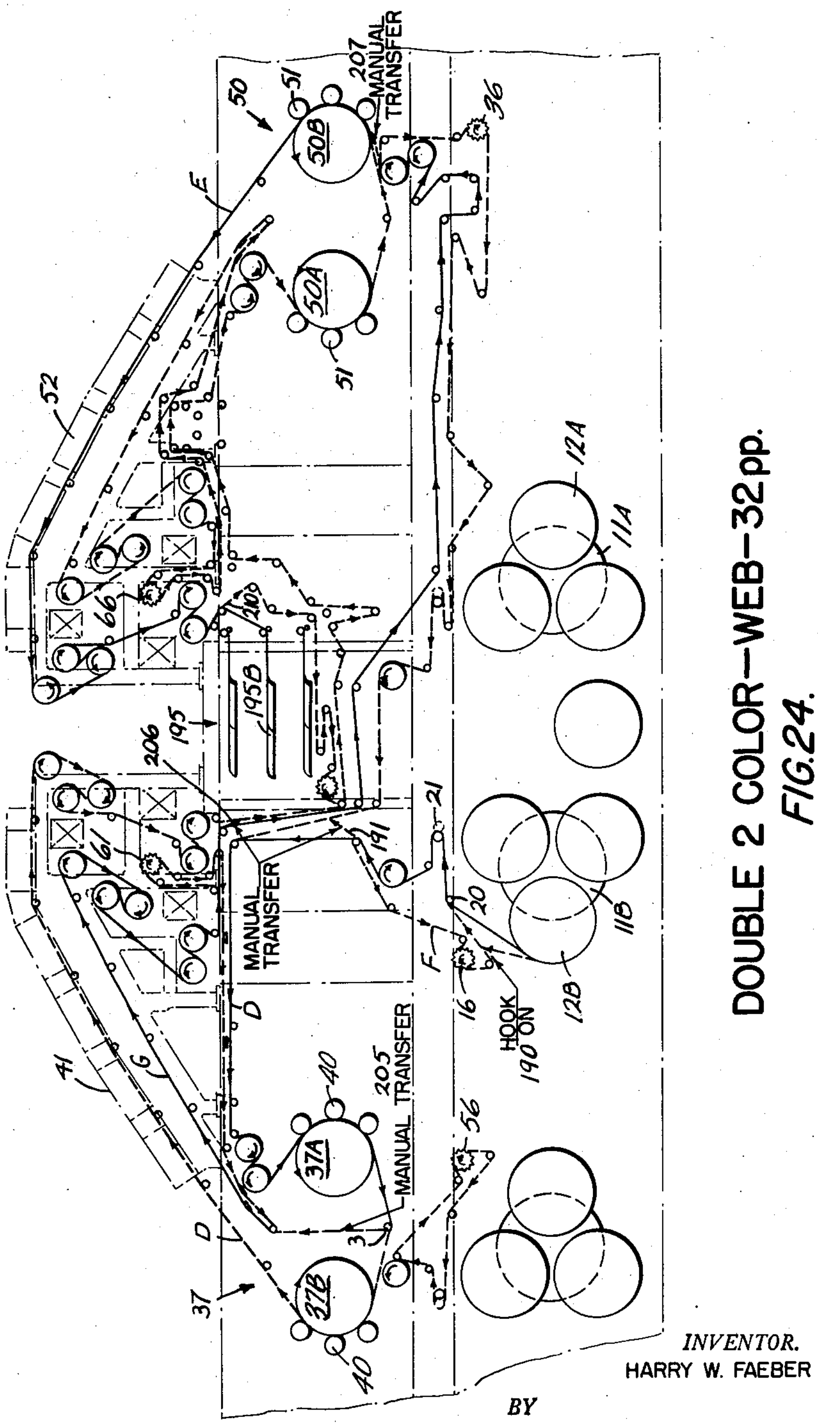
Figure 24 is a view similar to Figure 22 showing another method of threading the machine for double two-color web 32-page printing.

In threading a double two-color 32-page web, the paper withdrawn from the supply roll 12B (shown in Figure 24) on the supporting frame 11B is hooked onto the threading chains F at 190 and carried to the manual transfer point 191, where it is transferred to the threading unit D, just as in the case of the double four-color single web threading described in Figure 22. However, after the web has reached the small guide roll 43 in the first printing unit 37, it is transferred manually to the pair of threading chains G and carried through the first dryer 41. At the manual transfer point 206 the web is removed from the threading chains G and secured to the chains D. The chains D carry the web to the manual transfer station 207, where it is removed from the chains D and transferred to the threading unit E, which carries it around the second impression cylinder 50B of the second printing unit 50. After passing through the dryer 52, the paper is transferred manually from the chains E to the folder 195B at the station 210.

Figure 25:
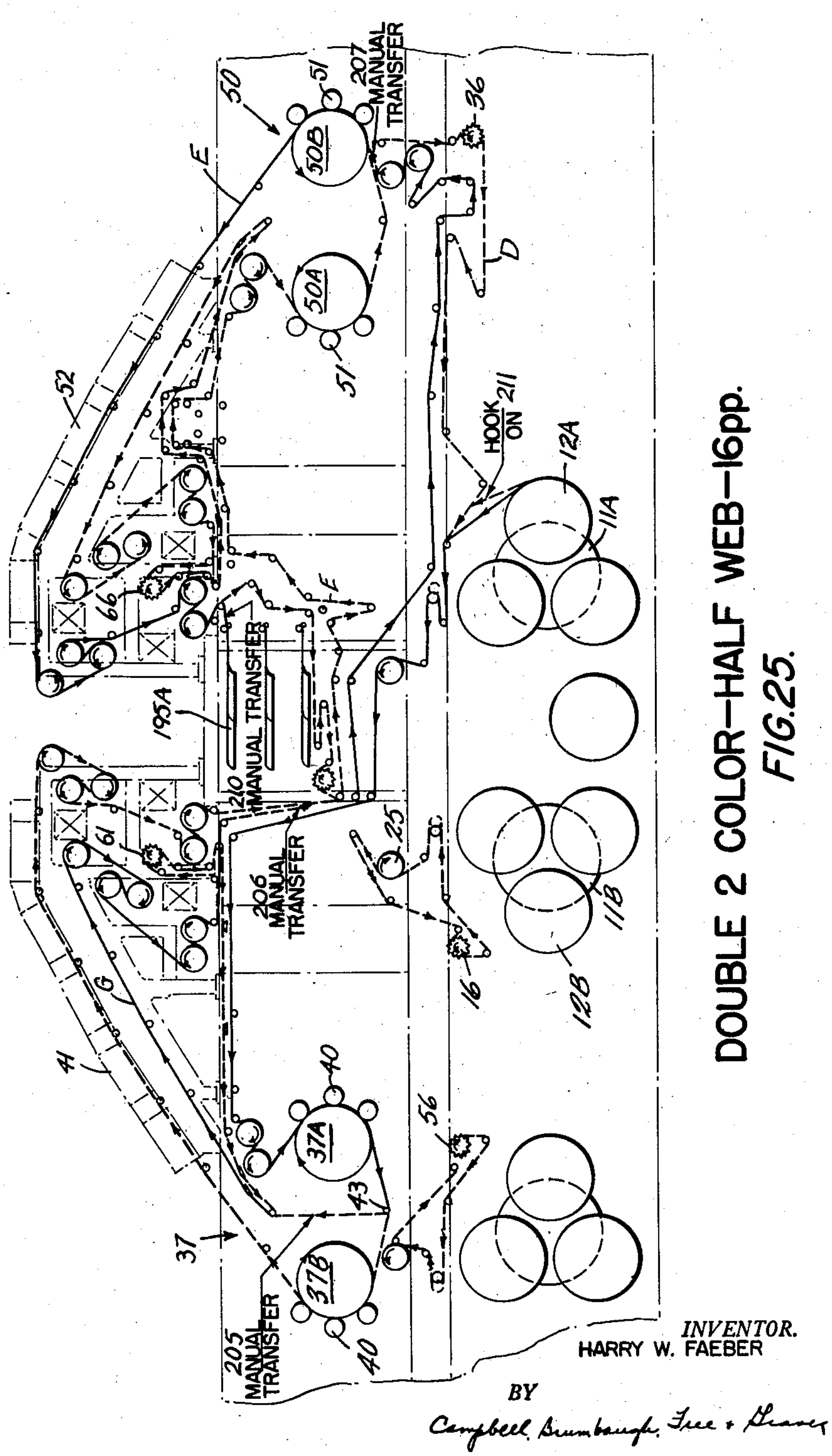
Figure 25 is a view similar to Figure 22, illustrating the threading of the printing machine for double two-color half web 16-page printing.

The threading of a double two-color 16-page half web is illustrated in Figure 25, where the paper sheet is withdrawn from the roll 12A supported on the frame 11A, and is hooked onto the threading chains D at the station 211. The chains carry the web along the path illustrated in Figure 25 toward the first cylinder 37A of the first printing unit 37. The path of the material from this point is the same as that described and shown in Figure 24, i. e., through the dryer on the chains G, then by the pair of chains D (from the transfer point 206) to the manual transfer point 207 adjacent the cylinder 50B, then by the chain pair E through the second dryer 52 to the manual transfer station 210. At this point, the web is removed manually from the threading chains and fed to the folding mechanism 195A shown in Figure 25.

Figure 26:
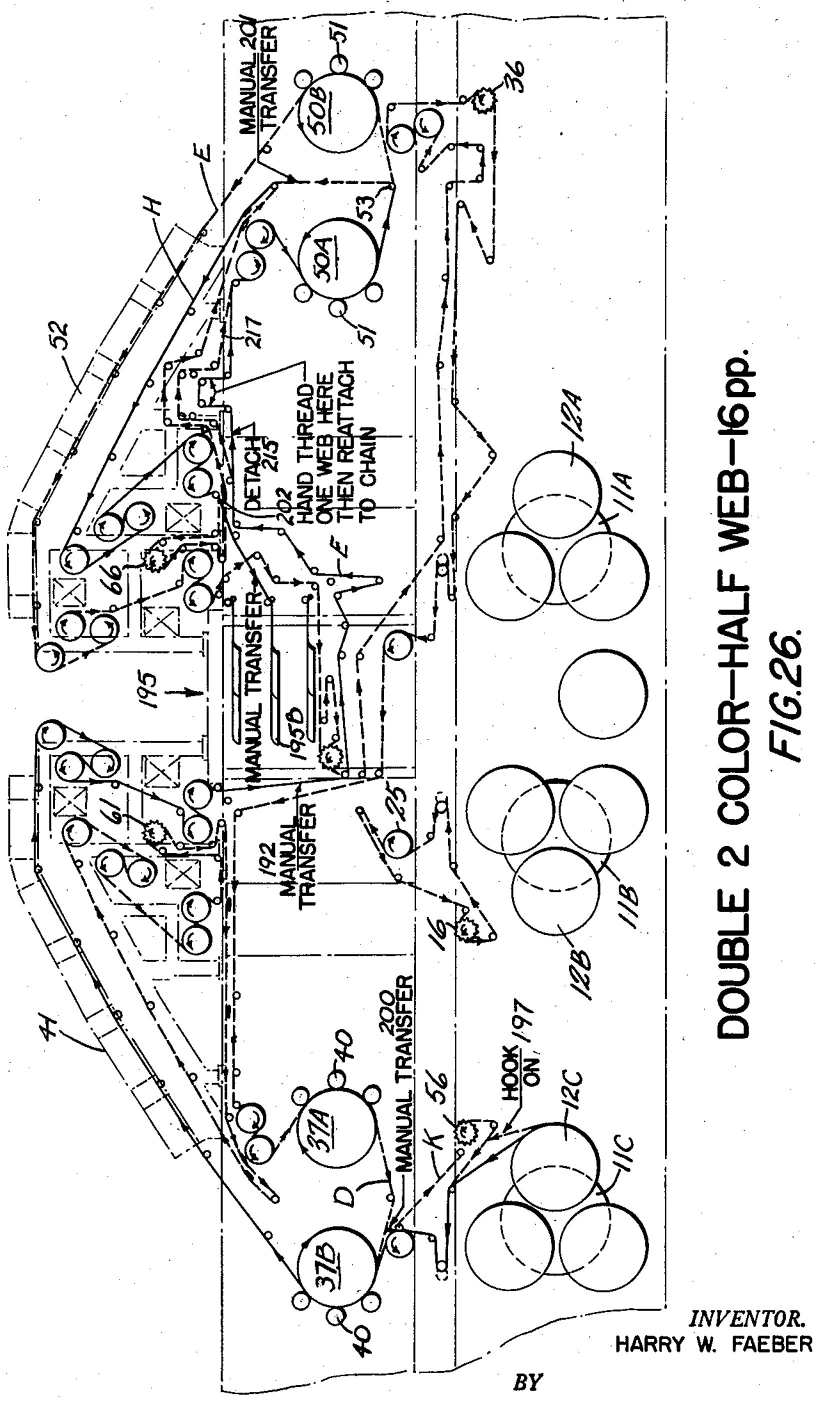
Figure 26 is a view similar to Figure 22, illustrating another method of threading the printing machine for double two-color half web 16-page printing.

The threading of a double two-color 16-page half web may be carried out from the roll 12C supported on the framework 11C shown in Figure 26. As in the operation described in Figure 23, the pair of threading chains K is used to convey the sheet to the manual transfer station 200, where it is removed and placed on the chains D. After passing through the first dryer 41, the sheet is transferred manually at the station 192 to the chains E. At the point 215 the sheet is removed from the chains E and hand-threaded over the guide rollers, as shown at 216. At the point 217, the sheet is again attached to the chains E which then carry the sheet to the guide roll 53, at which point it is transferred manually at the station 201 to the chains of threading unit H. After passing through the second dryer 52, the sheet is removed manually from the chains at the station 202 and fed into the center folding unit 195B.

I claim:

1. A mechanism for threading a machine for processing an elongated sheet of material, said machine having a series of rotatable cylinders adapted to engage said sheet and guide it through a tortuous path about said cylinders, said cylinders including a printing couple, comprising a pair of elongated elements on opposite sides of the machine movable along the path of the material, an elastic strip suspended across the space between said pair of elongated elements, means for securing said elastic strip to each of said elements traversing the machine so as to form an elastic connection between said elements that is adapted to be attached to the leading edge of the material for threading, and means to drive the elements to thread the machine.

2. A mechanism for threading a machine for processing an elongated sheet of material, said machine having a series of rotatable cylinders adapted to engage said sheet and guide it through a tortuous path about said cylinders, comprising a pair of endless elements on opposite sides of the machine movable along the path of the material, an elastic strip suspended across the space between said pair of elongated elements, means for securing said elastic strip to each of said endless elements traversing the machine so as to form an elastic connection between said elements that is adapted to be attached to the leading edge of the material for threading, and means to guide said endless elements in a predetermined path so as to resist the inward pull exerted by the elastic strip when the element pulls the leading edge of the material through the machine, and means to drive the endless elements to thread the machine.

3. A mechanism as described in claim 2 wherein the guiding means are rails and the endless elements have pairs of parallel laterally extending flanges that fit over the edge of such rails thereby to guide the elements and resist inward pull exerted by the elastic strip.

4. A mechanism for threading a machine for processing an elongated sheet of material, said machine having a series of rotatable cylinders adapted to engage said sheet and guide it through a tortuous path about said cylinders, comprising a pair of endless elements on opposite sides of the machine movable along the path of the material, means for securing an elastic strip to each of said endless elements traversing the machine, an elastic element traversing the machine and secured to said means so as to form an elastic connection between said elements that is adapted to be attached to the leading edge of the material for threading, and means to guide said endless elements in a predetermined path so as to resist the inward pull exerted by the elastic strip when the element pulls the leading edge of the material through the machine, and means to drive the endless elements to thread the machine.

5. A printing machine having the threading mechanism described in claim 4 wherein the elastic element is silicone rubber, which is resistant to heat and pressure.

6. A mechanism for driving the endless elements of a threading device for a machine for processing an elongated sheet of material, said driving mechanism comprising a rotatable shaft and members supported and driven by said shaft that are operatively engaged with said endless elements to drive said elements, a first driving head that is supported by said shaft, rotatable with respect thereto, connected with means for driving the endless elements at idling speed and has means adjacent the shaft for engaging a clutch, a second driving head that is supported by said shaft, rotatable with respect thereto, connected with means for driving the endless elements at approximately the speed of the sheet of material and has means adjacent the shaft for engaging a clutch, and a clutch that is slidable on said shaft but constrained to rotate therewith and operable to engage each of said clutch-engaging means to drive the endless elements at the desired speed.

7. A mechanism for driving the endless elements of a threading device for a machine for processing an elongated sheet of material, said driving mechanism comprising a rotatable shaft and members driven by said shaft that are operatively engaged with said endless elements to drive said elements, a first driving head that is rotatable independently of said shaft, connected with means for driving the endless elements at idling speed, and has means for engaging a clutch, a second driving head that is rotatable independently of said shaft connected with means for driving the endless elements at approximately the speed of the sheet of material, and has means for engaging a clutch, and a clutch that is constrained to rotate with the shaft and is operable to engage each of said clutch engaging means to drive the endless elements at the desired speed.

8. An apparatus in which a web is fed to a printing press and to a drying chamber in sequence, comprising a plurality of rollers for guiding the web through the printing press and the drying chamber; a pair of endless carriers, one disposed on each side of the path of the web, an elastic connection suspended between the pair of endless carriers, said elastic connection serving to guide the leading end of the web through the apparatus, a main drive system for the apparatus, a clutch for connecting and disconnecting the main drive system to and from the carriers, an auxiliary drive means for imparting movement to the carriers, and thermostatically controlled means for rendering operative the auxiliary drive means when the temperature in the drying chamber exceeds a predetermined safe temperature for the carriers.

References Cited in the file of this patent

UNITED STATES PATENTS

| | | |
|---|---|---|
| 1,679,411 | De Potter | Aug. 7, 1928 |
| 2,277,319 | Greenberger | Mar. 24, 1942 |
| 2,731,262 | Morrow | Jan. 17, 1956 |

UNITED STATES PATENT OFFICE

CERTIFICATE OF CORRECTION

Patent No. 2,862,705 December 2, 1958

Harry W. Faeber

It is hereby certified that error appears in the printed specification of the above numbered patent requiring correction and that the said Letters Patent should read as corrected below.

Column 5, line 70, for "pack-up" read -- back up --; column 9, line 30, claim 1, strike out "said cylinders including a printing couple," and insert the same after "cylinders," in line 44, same column, claim 2.

Signed and sealed this 10th day of March 1959.

(SEAL)
Attest:

KARL H. AXLINE
Attesting Officer

ROBERT C. WATSON
Commissioner of Patents